April 4, 1967   P. C. KEITH ETAL   3,312,074
AIR SEPARATION PLANT
Filed May 6, 1964
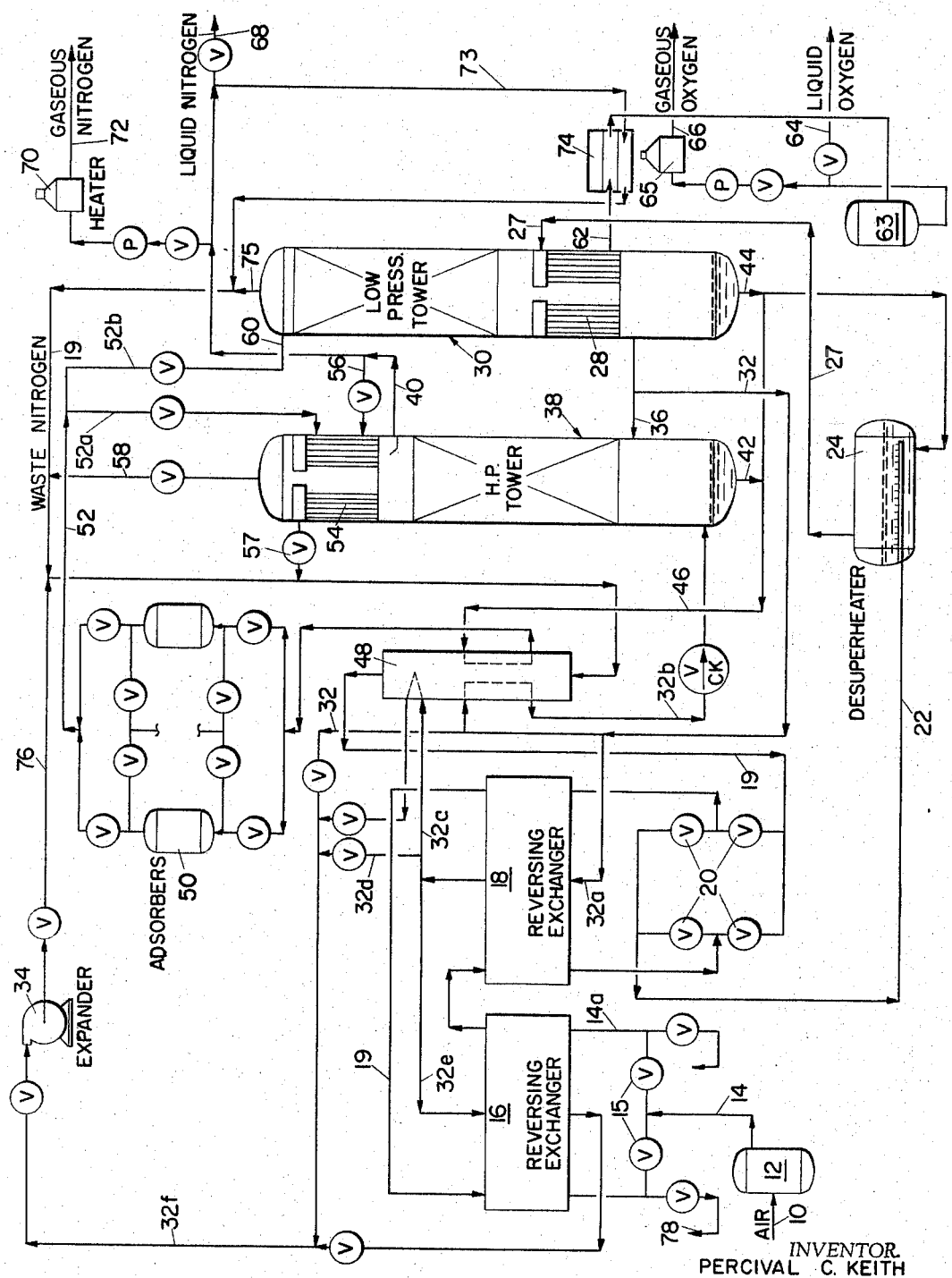

United States Patent Office 3,312,074
Patented Apr. 4, 1967

3,312,074
AIR SEPARATION PLANT
Percival C. Keith, Peapack, N.J., and Emil Cimler, Port Washington, N.Y., assignors to Hydrocarbon Research, Inc., New York, N.Y., a corporation of New Jersey
Filed May 6, 1964, Ser. No. 365,242
4 Claims. (Cl. 62—13)

This invention relates to improvements in small air separation plants in the order of two tons per day of oxygen and particularly adapted for mobile transport.

It is known that air rectification processes of high efficiency can be, and are being made. With large production requirements in the order of hundreds of tons per day of liquid oxygen, for example, there can be and usually is paid, a substantial premium for high efficiency. This includes provision for large heat exchangers and associated equipment.

There are some cases, however, where these pieces of apparatus are not appropriate. This is particularly so when only small demands are made for liquid oxygen, and where mobility of the unit is required, as on shipboard or on trailers, and in such case, simplified and less costly equipment must be made available, even at the sacrifice of efficiency.

It is the principal object of our invention to simplify an air separation process producing small quantities of liquid oxygen, or nitrogen.

More particularly, our invention relates to an improved process and plant for the production of small quantities of liquid oxygen and/or liquid nitrogen, from a freely available source of low pressure air in the order of 75 p.s.i.a., which air is available as, for example, as bleed from a standard gas turbine, such plant utilizing reversing exchangers for removal of ice and hydrates.

By the use of a multiple column fractionation system, and splitting of the available air into separate portions for independent production of the necessary refrigeration, and by the interchange of low temperature liquid oxygen from the low pressure column to the reboiler in the high pressure column, we provide a relatively low cost air liquefaction plant having substantial flexibility in product yield.

Further objects and advantages of our invention will appear from the following description of a preferred form of embodiment thereof when taken with the drawing attached hereto which is a schematic flow diagram of the improved air separation process.

In accordance with our invention, air at 10 which is available at 75 p.s.i.a. as a waste product as from the bleed of a turbine, is passed through a surge and knockout drum 12, and thence by line 14 and customary reversing valves 15, and line 14a, is passed through reversing exchangers 16 and 18 wherein it is cooled in heat exchange with a cold waste gas, usually nitrogen, from line 19 which, upon being heated, is rejected to atmosphere.

As is well known, moisture and carbon dioxide in the air tend to solidify and are deposited on the walls of the exchangers 16 and 18 and at approximately fifteen minute intervals the flow is automatically reversed by air operated valves to the alternate passages in the exchangers and the dry waste exhaust gas then removes the deposited water and carbon dioxide previously deposited. At the same time, the air in the alternate passages is cooled and tends to deposit moisture and carbon dioxide therein as before.

The cold air then passes through check valves 20 and by line 22 is conducted to the desuperheater 24. By direct contact with a small portion of condensed crude oxygen liquids from the fractionation towers hereinafter described, the air is the therein reduced in temperature to about −283° F. at the pressure of approximately 71 p.s.i.a. which is substantially its dew point.

Cold saturated vapor air in line 27 is now passed through the reboiler 28 in low pressure tower 30 wherein some condensation of air takes place which is collected in the bottom of this tower. A portion of non-condensed air in line 32 now flows through line 32f to the turbo-expander 34 which provides all of the plant refrigeration needs. The balance of the non-condensed air passes by line 36 to the lower part of high pressure tower 38.

A part of the air in line 32 may be condensed in circuit 32b through heat exchanger 48 and returned to the bottom of high pressure tower 38. A part of the air in line 32 flowing to line 32a is heated to in the order of 50° F. superheat by passing in exchanger 18. Another portion of air in line 32c may be cooled in the upper part of exchanger 48. A small part 32e of air from exchanger 18 may flow to exchanger 16 and therein join air flow from lines 32, 32c, and 32d. The mixed air flows in 32f to turbo-expander 34 at about 70 p.s.i.a. and is expanded to approximately −300° F. and 20 p.s.i.a.

In high pressure tower 38 the air is fractionated into a pure nitrogen liquid overhead in line 40 and a crude oxygen (enriched air) bottoms removed at line 42. This rich air liquid of exchanger 28 in part with the liquid rich air in line 44 from the bottom of exchanger 28 may be used in the desuperheater 24. The balance of the rich air is passed by line 46 through heat exchanger 48 and adsorbers 50 wherein traces of hydrocarbons are removed. The rich air in line 52 now divides into two streams, each stream let down in pressure. One stream, 52a, passes to the condenser 54 in the upper part of the high pressure column 38, and the other stream 52b flows to the top of low pressure column 30.

Condensation duty in condenser 54 is thus accomplished by the vaporizing rich air and may be augmented by pure nitrogen in line 56. The vapors discharge in line 58 and also become part of the waste nitrogen line 19. Vent gases from exchanger 54 pass through valve 57 to the waste nitrogen line 19.

The balance of the rich air liquid in line 52b which passes through line 60 into the top of the low pressure tower 30 is finally fractionated with product liquid oxygen produced at the bottom of the reboiler 28 and removed through line 62 and passed through surge drum 63 from which liquid oxygen may be removed at 64 or vaporized at 65 to produce vapor oxygen at 66.

The nitrogen removed at 40 from the high pressure tower is similarly available as liquid product in line 68 or it may be vaporized at 70 and removed as vapor at 72. Suitable pumps can be used for predetermined pressuring of the gaseous products. If desired, a slip stream 73 of liquid nitrogen may be passed in heat exchange at 74 with the liquid oxygen stream 62.

Waste gas in line 19 from the plant includes waste nitrogen in line 75 from the top of low pressure tower 30 and waste nitrogen in line 58 from the top of condenser 54. These streams join the expander discharge 76, provide cooling duty in exchanger 48 and are directed through line 19 and valves 20 to the reversing passes in exchangers 18 and 16, being discharged at 78.

The preferred operating conditions are:

|  | P.s.i.a. |
|---|---|
| High pressure column 38 | −71 |
| Low pressure column 30 | −22 |

It will thus be seen that in an air separation process, wherein excess air is available at 75 p.s.i.a as from bleed air stream from a standard gas turbine, in which the air is compressed and then cooled in the well known reversing exchangers and thereafter fractionated in a double column, the advantages are:

(1) use of low pressure air system and reversing exchangers for cooling and cleaning the air without the need of gas streams at 3000 p.s.i. as is customary in typical small liquid oxygen plants precluding a safe installation;

(2) the absence of chemical or mechanical clean-up of air which results in simple operation with minimum attention and maximum on-stream time, and having all the advantageous features of large tonnage plants;

(3) within the confines of the limited space such as in a trailer or on shipboard, no liquid pumps are used within the process, utilizing the condensing and reboiling services of two heat exchangers embodied within the two towers, such exchangers operating at temperatures and pressures related to the proper oxygen and nitrogen content to provide temperature differences across the exchangers.

While we have shown and described a preferred form of embodiment of our invention, we are aware that modifications may be made thereto and we therefore desire a broad interpretation of our invention within the scope and spirit of the description herein and of the claims appended hereinafter.

We claim:

1. The method of separating air into its principal constituents in a high and low pressure fractionation zone which comprises passing said air through a series of reversing exchangers in heat exchange with a relatively cold waste gas to reduce the temperature of the air to substantially its temperature of liquefaction, passing said air through a reboiler for the low pressure fractionation zone to vaporize liquid therein and thence into a high pressure fractionation zone in the presence of reflux to separate an oxygen rich liquid from a nitrogen overhead, passing said oxygen rich liquid in part to the low pressure fractionation zone and in part in heat exchange with vapors in the high pressure fractionation zone the parts being in parallel flow, passing said nitrogen overhead from the high pressure zone through the reversing exchangers as the relatively cold waste gas, expanding a non-condensed air from the high pressure fractionation zone to supply the refrigeration requirements for the system, and removing a liquid constituent of the air as a product.

2. The method of separating air as claimed in claim 1 wherein the non-condensed air, in part is passed in heat exchange with the feed air passing through a reversing exchanger, the feed air is superheated in the order of 50° F., and is subsequently desuperheated with liquid oxygen rich air.

3. The method of separating air as claimed in claim 1 wherein a liquid oxygen product is removed from the reboiler in the low pressure fractionation zone.

4. The method of separating air as claimed in claim 1 wherein a liquid nitrogen product is removed from the upper portion of the high pressure fractionation zone.

References Cited by the Examiner
UNITED STATES PATENTS

| | | | |
|---|---|---|---|
| 2,537,046 | 1/1951 | Garbo | 62—14 |
| 2,715,323 | 8/1955 | Johnson | 62—14 |
| 2,850,880 | 9/1958 | Jakob | 62—29 |
| 3,209,548 | 10/1965 | Grunberg et al. | 62—13 X |
| 3,216,206 | 11/1965 | Kessler | 62—13 |

NORMAN YUDKOFF, *Primary Examiner.*

V. W. PRETKA, *Assistant Examiner.*